United States Patent
Kludt et al.

(10) Patent No.: US 8,599,955 B1
(45) Date of Patent: Dec. 3, 2013

(54) SYSTEM AND METHOD FOR DISTINGUISHING BETWEEN ANTENNAS IN HYBRID MIMO RDN SYSTEMS

(71) Applicant: Magnolia Broadband Inc., Warren, NJ (US)

(72) Inventors: Kenneth Kludt, San Jose, CA (US); Haim Harel, New York, NY (US); Eduardo Abreu, Allentown, PA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 13/762,191

(22) Filed: Feb. 7, 2013

Related U.S. Application Data

(63) Continuation-in-part of application No. 13/630,146, filed on Sep. 28, 2012.

(60) Provisional application No. 61/652,743, filed on May 29, 2012, provisional application No. 61/657,999, filed on Jun. 11, 2012, provisional application No. 61/665,592, filed on Jun. 28, 2012, provisional application No. 61/658,015, filed on Jun. 11, 2012, provisional application No. 61/658,010, filed on Jun. 11, 2012, provisional application No. 61/658,012, filed on Jun. 11, 2012, provisional application No. 61/658,006, filed on Jun. 11, 2012, provisional application No. 61/665,590, filed on Jun. 28, 2012, provisional application No. 61/665,636, filed on Jun. 28, 2012.

(51) Int. Cl.
*H04B 7/02* (2006.01)
*H04L 1/02* (2006.01)

(52) U.S. Cl.
USPC .......... 375/267; 375/347; 375/260; 375/346; 375/349; 348/614; 348/607; 455/67.13; 455/63.1; 455/137; 455/138; 455/139

(58) Field of Classification Search
USPC .......... 375/347, 267, 260, 346, 349; 348/614, 348/607; 455/67.13, 63.1, 137–139
See application file for complete search history.

(56) References Cited

U.S. PATENT DOCUMENTS

| 6,046,655 A | 4/2000 | Cipolla |
| 6,226,507 B1 | 5/2001 | Ramesh et al. |

(Continued)

FOREIGN PATENT DOCUMENTS

| EP | 1 867 177 | 5/2010 |
| EP | 2 234 355 | 9/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Phuong Phu
(74) *Attorney, Agent, or Firm* — Pearl Cohen Zedek Latzer Baratz, LLP

(57) ABSTRACT

A system for distinguishing between any one of a plurality of antennas in a multiple-input-multiple-output (MIMO) system having an augmented number of antennas is provided herein. The system includes a MIMO receiving system having N branches and configured to operate in accordance with a channel estimation MIMO receiving scheme; a radio distribution network (RDN) connected to the MIMO receiving system, the RDN comprising at least one beamformer, being fed by two or more antennas, so that a total number of antennas in the system is M, wherein M is greater than N, wherein each one of the beamformers include a combiner configured to combine signals coming from the antennas into a single signal; and at least one antenna distinguishing circuitry, each associated with a respective beamformer, wherein the antenna distinguishing circuitry is configured to distinguish between the signals coming from the antennas which feed the respective beamformer.

20 Claims, 8 Drawing Sheets

(56) References Cited

U.S. PATENT DOCUMENTS

| | | |
|---|---|---|
| 6,321,077 B1 | 11/2001 | Saitoh et al. |
| 6,377,783 B1 | 4/2002 | Lo et al. |
| 6,927,646 B2 | 8/2005 | Niemi |
| 6,987,958 B1 | 1/2006 | Lo et al. |
| 7,257,425 B2 | 8/2007 | Wang et al. |
| 7,499,109 B2 * | 3/2009 | Kim et al. ............... 348/614 |
| 7,742,000 B2 | 6/2010 | Mohamadi |
| 7,769,107 B2 | 8/2010 | Sandhu et al. |
| 7,898,478 B2 | 3/2011 | Niu et al. |
| 8,155,613 B2 | 4/2012 | Kent et al. |
| 8,294,625 B2 | 10/2012 | Kittinger et al. |
| 8,369,436 B2 * | 2/2013 | Stirling-Gallacher ........ 375/267 |
| 8,509,190 B2 | 8/2013 | Rofougaran |
| 2004/0125900 A1 | 7/2004 | Liu et al. |
| 2005/0129155 A1 | 6/2005 | Hoshino |
| 2005/0245224 A1 | 11/2005 | Kurioka |
| 2005/0287962 A1 | 12/2005 | Mehta et al. |
| 2006/0135097 A1 | 6/2006 | Wang et al. |
| 2006/0264184 A1 | 11/2006 | Li et al. |
| 2006/0270343 A1 | 11/2006 | Cha et al. |
| 2007/0223380 A1 | 9/2007 | Gilbert et al. |
| 2008/0051037 A1 | 2/2008 | Molnar et al. |
| 2008/0144737 A1 | 6/2008 | Naguib |
| 2008/0238808 A1 | 10/2008 | Arita et al. |
| 2008/0280571 A1 | 11/2008 | Rofougaran et al. |
| 2009/0028225 A1 | 1/2009 | Runyon et al. |
| 2009/0046638 A1 | 2/2009 | Rappaport et al. |
| 2009/0121935 A1 | 5/2009 | Xia et al. |
| 2009/0268616 A1 | 10/2009 | Hosomi |
| 2009/0322613 A1 | 12/2009 | Bala et al. |
| 2010/0172429 A1 | 7/2010 | Nagahama et al. |
| 2010/0234071 A1 | 9/2010 | Shabtay et al. |
| 2010/0285752 A1 | 11/2010 | Lakshmanan et al. |
| 2011/0032972 A1 | 2/2011 | Wang et al. |
| 2011/0150050 A1 | 6/2011 | Trigui et al. |
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2012/0020396 A1 | 1/2012 | Hohne et al. |
| 2012/0033761 A1 | 2/2012 | Guo et al. |
| 2012/0230380 A1 | 9/2012 | Keusgen et al. |

FOREIGN PATENT DOCUMENTS

| | | |
|---|---|---|
| WO | WO 03/047033 | 6/2003 |
| WO | WO 03/073645 | 9/2003 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Partial International Search Report for International Application No. PCT/US2013/043056 dated Sep. 5, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.

* cited by examiner

US 8,599,955 B1

SYSTEM AND METHOD FOR DISTINGUISHING BETWEEN ANTENNAS IN HYBRID MIMO RDN SYSTEMS

CROSS-REFERENCE TO RELATED APPLICATIONS

This application is a non-provisional patent application claiming benefit from U.S. provisional patent application Ser. Nos. 61/658,015 filed on Jun. 11, 2012; 61/658,010 filed on Jun. 11, 2012; 61/658,012 filed on Jun. 11, 2012; 61/658,006 filed on Jun. 11, 2012; 61/665,590 filed on Jun. 28, 2012; and 61/665,636 filed on Jun. 28, 2012; this application is also a continuation-in-part application of U.S. patent application Ser. No. 13/630,146 filed on Sep. 28, 2012, which claims benefit from U.S. provisional patent application Ser. Nos. 61/652,743 filed on May 29, 2012; 61/657,999 filed on Jun. 11, 2012; and 61/665,592 filed on Jun. 28, 2012, all of which are incorporated by reference herein in their entirety.

FIELD OF THE INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers.

The term "Receiving Radio Distribution Network" or "Rx RDN" or simply "RDN" as used herein is defined as a group of beamformers as set forth above.

In MIMO systems the channel is estimated by the receiver via measurements done over known patterns (e.g. transmitted Pilots); the channel estimation is used for received data decoding. While channel estimation is continuously performed by the receiver, the channel information corresponds to the combined channel and not to the individual Rx antennas. When an Rx beamformer is used and needs tuning for achieving desired weights, the channel estimation measurements are re-used by the beamformer, registering phases, amplitudes, SINRs of the various incoming signals from different antennas. Since the signals of the various antennas are combined, the assessment of each one's contribution is blurred by the others' contribution; therefore a mechanism to isolate individual contributions of each antenna is required. This mechanism has various possible implementations and is labeled "Antenna Distinguishing".

BRIEF SUMMARY OF EMBODIMENTS OF THE INVENTION

According to some embodiments of the present invention, a system for distinguishing antennas in a multiple-input-multiple-output (MIMO) system is provided herein. The system may include a MIMO receiving system having N branches and configured to operate in accordance with a channel estimation MIMO receiving scheme; a radio distribution network (RDN) connected to the MIMO receiving system, the RDN comprising at least one beamformer, being fed by two or more antennas, so that a total number of antennas in the system is M, wherein M is greater than N, wherein each one of the beamformers has antenna distinguishing circuitry capable of distinguishing between the signals coming from the antennas which feed the respective beamformer, the beamformers also including a combiner configured to combine signals coming from the antennas which feed the respective beamformer into a single signal.

According to some embodiments of the present invention, a method of distinguishing antennas in a multiple-input-multiple-output (MIMO) system is provided herein. The method includes the following stages: receiving radio frequency (RF) MIMO transmission via M antennas coupled to a MIMO receiving system having N branches and configured to operate in accordance with a channel estimation MIMO receiving scheme, wherein M is greater than N; beamforming groups of two or more of the M antennas into each one of the N channels by combining signals coming from the antennas into a combined signal; and distinguishing between the signals coming from the antennas in each one of the groups by applying RF manipulation during the beamforming.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
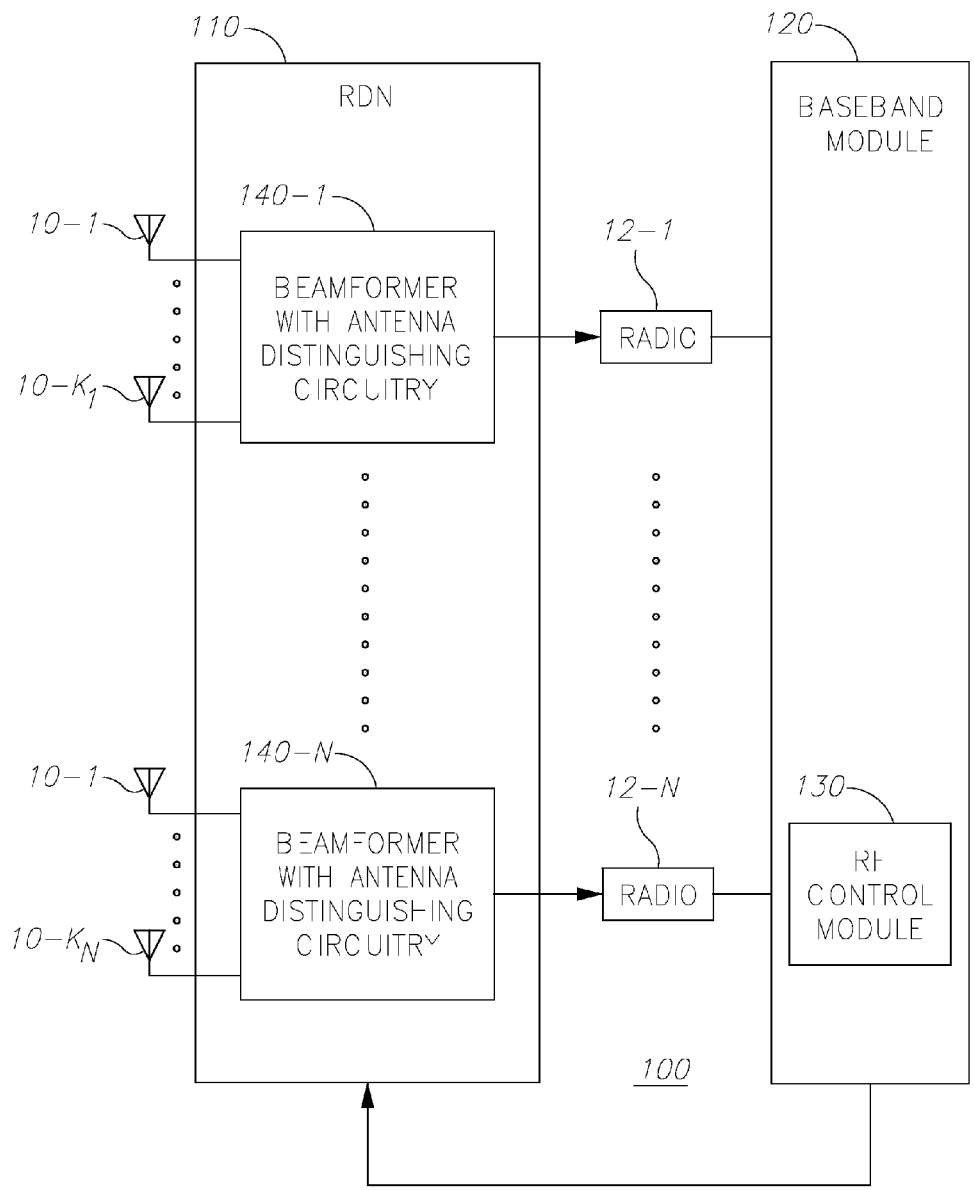
FIG. 1 is a high level block diagram illustrating a system according to embodiments of the present invention.

The drawings together with the following detailed description make the embodiments of the invention apparent to those skilled in the art.

DETAILED DESCRIPTION OF EMBODIMENTS OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 2:
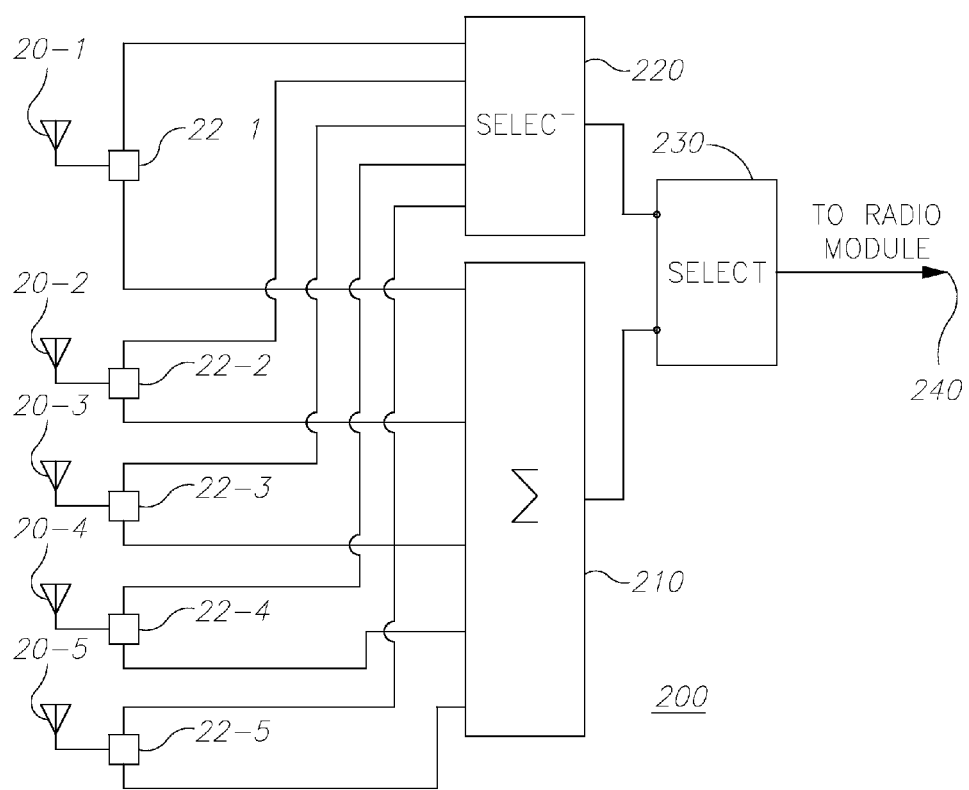
FIG. 2 is a high level block diagram illustrating one aspect of a system according to embodiments of the present invention.
Figure 3:
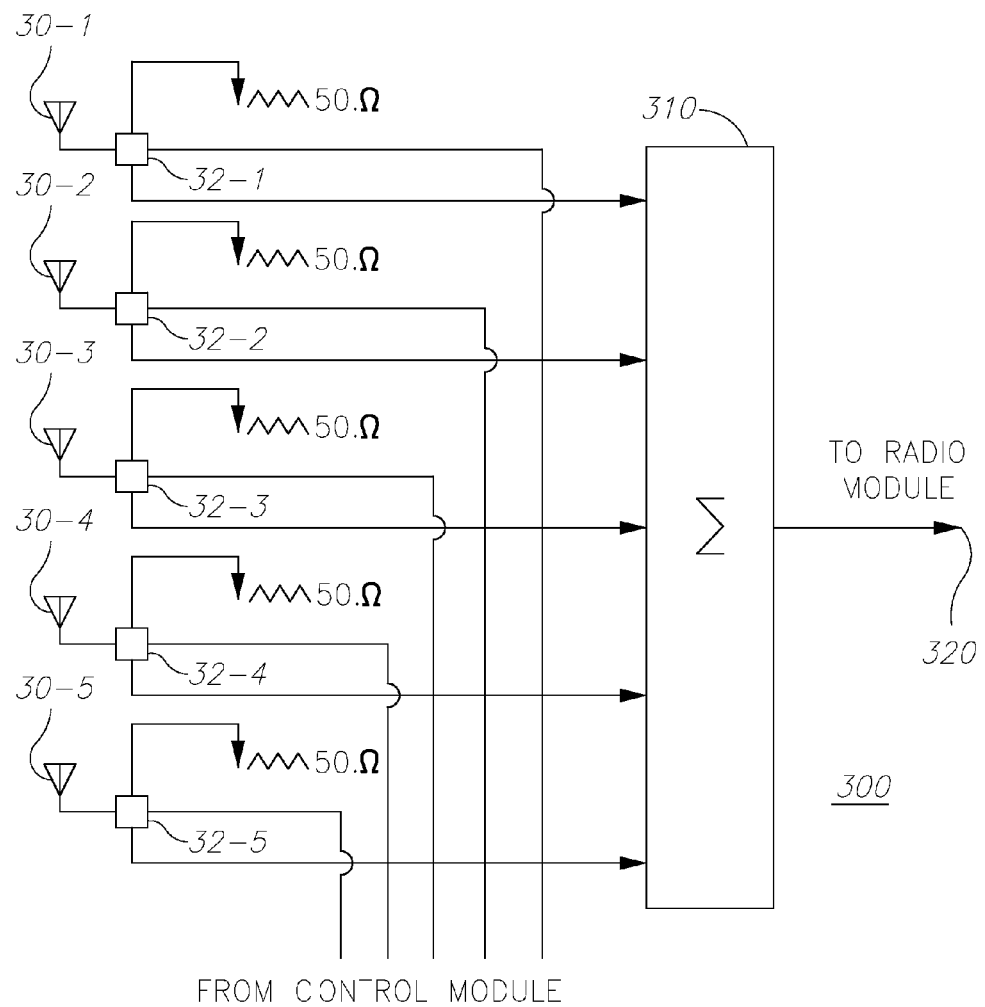
FIG. 3 is a high level block diagram illustrating another aspect of a system according to embodiments of the present invention.
Figure 4:
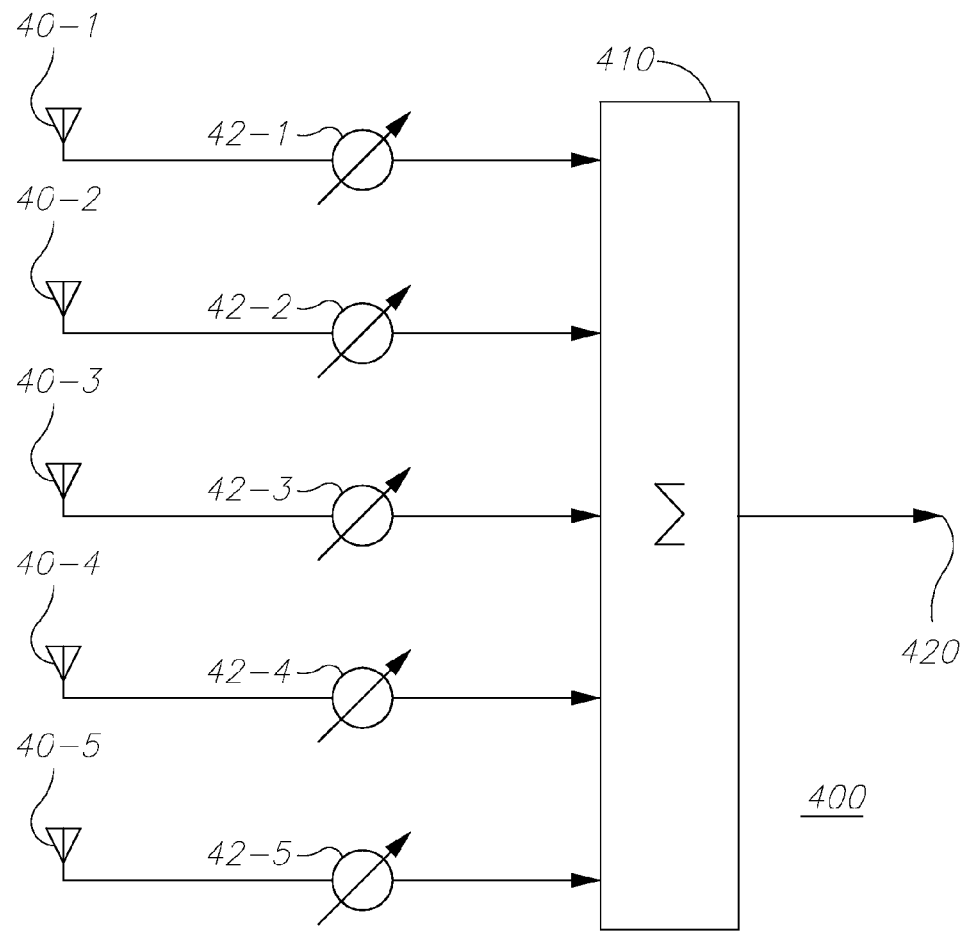
FIG. 4 is a high level block diagram illustrating yet another aspect of a system according to embodiments of the present invention.

FIG. 1 is a high level block diagram illustrating a system according to embodiments of the present invention. System 100 includes a multiple-input-multiple-output (MIMO) receiving system baseband module 120 having N branches and configured to operate, on the baseband level, in accordance with a channel estimation MIMO receiving scheme. System 100 further includes a radio distribution network 110 (RDN) connected to baseband module 120 via radio circuits 12-1 to 12-N. RDN 110 includes at least one beamformer with antenna distinguishing circuitry such as 140-1, being fed by two or more antennas such as 10-1 to 10-$K_1$, so that a total number of antennas in system 100 is M=$K_1$+$K_2$+ . . . +$K_N$, wherein M is greater than N. Additionally, each one of the beamformers includes a combiner (as shown in FIGS. 2-4) configured to combine signals coming from the antennas into a single combined signal converted to baseband by radio module 12-1 to 12-N. Baseband module 120 further includes an RF control module being configured to tune RDN 110, for example by adjusting phase shifters located within beamformers 140-1 to 140-N.

As shown above, system 100 includes one beamformer with antenna distinguishing circuitry for each group of antennas that is being combined into a single radio circuit. In operation, the beamformer is configured to distinguish between (e.g., to isolate individual contributions of) the signals coming from the antennas which feed the respective radio circuits. As will be explained below, there are many embodiments that may be used in order to implement the signal distinguishing operation which is crucial for derivation of phase and/or amplitude of each signal. These distinguishing schemes may further be controlled via control module 130. As will be described below the beamformer with antenna distinguishing circuitry may include radio frequency (RF) elements such as phase shifters, switches, terminators, and amplifiers.

FIG. 2 is a high level block diagram illustrating one aspect of a system according to embodiments of the present invention. System 200 is an exemplary non limiting embodiment of 5 antennas 20-1 to 20-5 wherein the beamformer includes a selectable bypass 22-1 to 22-5 for each antenna 20-1 to 20-5 configured to bypass combiner 210 in the respective beamformer and convey the signal from each one of antennas 20-1 to 20-5 to an output selector 220, and wherein the output selector is configured to deliver to the MIMO receiving system only the signal from one antenna at a time.

In some embodiments, it would be advantageous to provide a calibration element (not shown) for each one of the selectable bypass units, wherein the calibration element is configured to identify and take into account phase and amplitude difference between the combiner and the selectable bypass unit. The calibration element may be implemented by any combination of attenuator/amplifier and a phase shifter that may manipulate the phase, the amplitude or both of F signal. The calibration process may be carried out at the factory and may be either on the RF level or the baseband level or a combination thereof.

FIG. 3 is a high level block diagram illustrating another aspect of a system according to embodiments of the present invention. In exemplary system 300 the beamformer is configured to selectively disconnect and terminate all but one of the antennas so that only one signal coming from the antennas is conveyed to the output of the combiner, at a time. The disconnecting may be implemented, for example, by a set of switches 32-1 to 32-5 each switching a terminator for antennas 30-1 to 30-5. Each time, a different antenna signal is conveyed alone via combiner 310.

FIG. 4 is a high level block diagram illustrating yet another aspect of a system according to embodiments of the present invention. In this exemplary embodiment, in system 400, the beamformer is configured to selectively shift the phase of one antenna signal at a time and then resume original phase. The combined signal is compared after the phase is shifted and immediately after the phase has been restored so that phase and amplitude of the shifted phase shifter for each antenna can be derived. This can be implemented by controllable phase shifters 42-1 to 42-5 that are controlled by an RF control module 130 (shown in FIG. 1) configured to shift the phase of only one signal coming from the antennas 40-1 to 40-5 at a time, so that the MIMO receiving system may derive phase and/or amplitude of the signal coming from the antenna with the shifted phase by comparing the combined signals at two different phases. It should be noted that controllable phase shifters 42-1 to 42-5 may also be used, when not used to assist in the antenna distinguishing operation, to tune the antennas as a part of the process of applying weights to the RDN as a part of the channel estimation MIMO receiving scheme.

Figure 5:
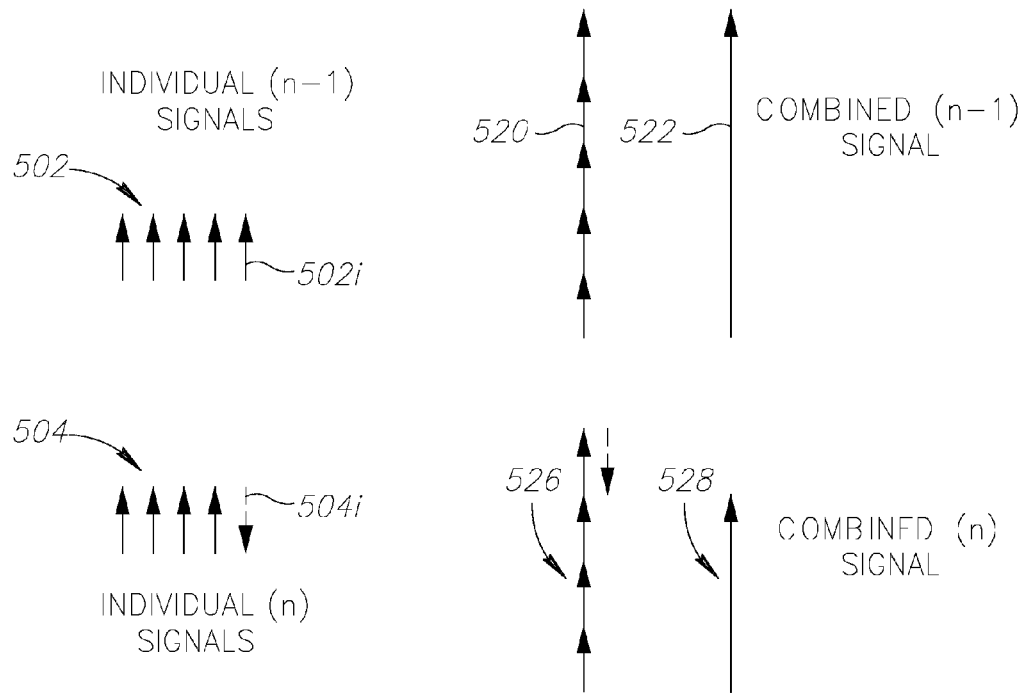
FIG. 5 is a signal diagram illustrating an aspect of a method according to some embodiments of the present invention.

FIG. 5 is a signal diagram illustrating an aspect of a method according to some embodiments of the present invention. In this example, the phase of antenna 502$i$ is changed in going from time instance n−1 to n and becomes 504$i$ as seen in 502 and 504 respectively. When looking at the combined signal at the respective times n−1 and n, it is apparent that combined signal 522 is longer than combined signal 528. This way both phase and amplitude of 502$i$ may be derived by applying a differential approach.

Figure 6:
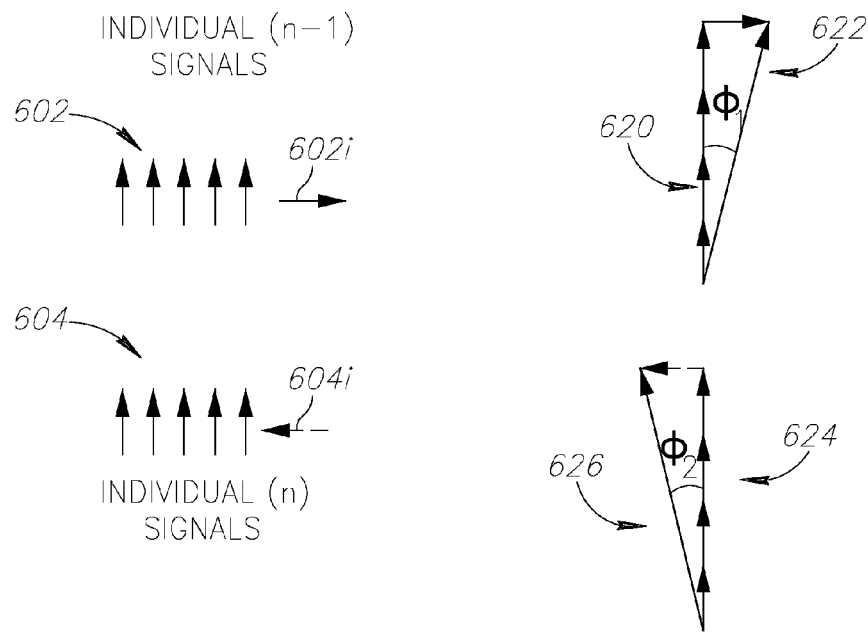
FIG. 6 is a signal diagram illustrating another aspect of a method according to some embodiments of the present invention.

FIG. 6 is a signal diagram illustrating another aspect of a method according to some embodiments of the present invention. In this example the signal's phase of 602i is not aligned with the rest of the signals coming from the rest of the antennas in 602 and so the combined signals 622 and 624 illustrate that the phase $\Phi_1$ is different from $\Phi_2$ and so again, both phase and amplitude of the single antenna may be derived by way of comparison.

Figure 7:
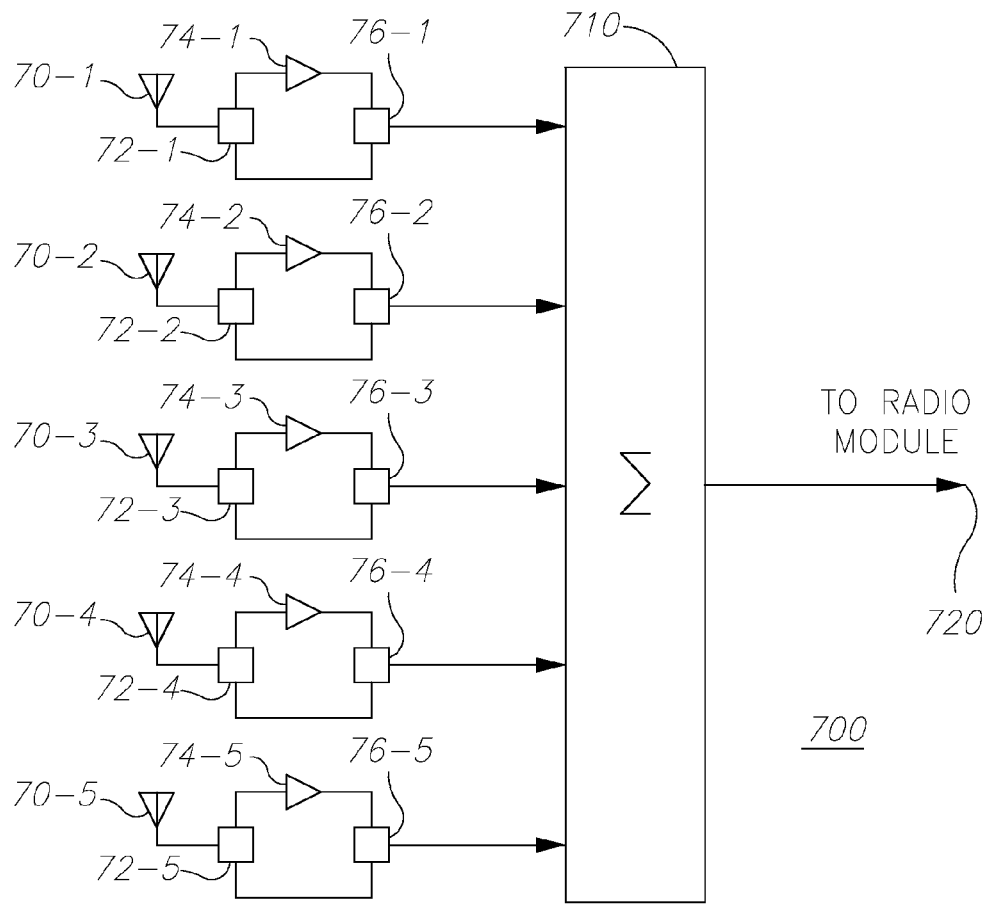
FIG. 7 is a high level block diagram illustrating yet another aspect of a system according to embodiments of the present invention.

FIG. 7 is a high level block diagram illustrating yet another aspect of a system according to embodiments of the present invention. In this exemplary embodiment, in system 700, the beamformer includes a controllable amplifier 74-1 to 74-5 that is controlled by an RF control module 130 (shown in FIG. 1) for each antenna. The amplifiers are configured to amplify only one signal coming from the antenna at a time, and wherein the MIMO receiving system is configured to derive phase and/or amplitude of the signal coming from the amplified antenna by comparing the combined signals at two different amplifications.

Figure 8:
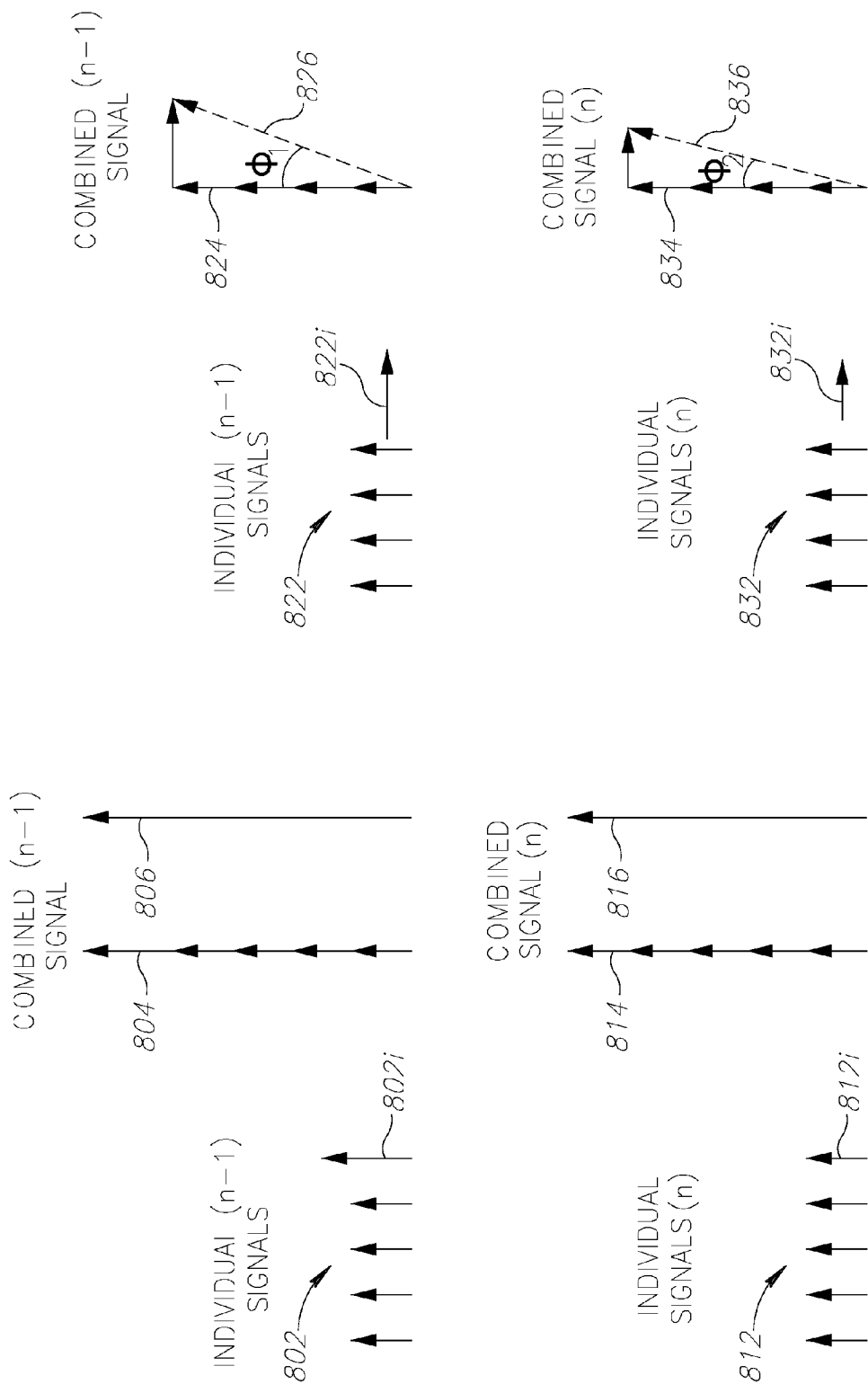
FIGS. 8A and 8B are signal diagrams illustrating yet another aspect of a method according to some embodiments of the present invention.

FIG. 8A shows a signal diagram illustrating yet another aspect of a method according to some embodiments of the present invention. In this example, a signal 802i is amplified at time n−1 and resumed at time n as shown in 802 and 812. The combined signal shown in 806 and 816 shows that the difference between them is apparent and both phase and amplitude of the amplified antenna can be derived. FIG. 8B illustrates this embodiment for a case in which signal 822i is not aligned with the rest of the signals. Another embodiment may be by using controllable attenuators instead of amplifiers and the effect of amplifying a single antenna (or its signal) may be achieved by attenuating the gain of all antennas but one, being the antenna that needs distinguishing at a specified point of time. It should be understood that many more implementations of antenna distinguishing may be used, some of which may include any combination of phase shifters, amplifiers, and attenuators.

Whenever the antenna distinguishing procedure is carried out with all antennas of a beamformer connected to the combiner, such as in the embodiments shown in FIGS. 4-8 above, a differential approach is used to derive channel information for the individual antennas. Let $h_i(n)$ be the external channel from the transmitter antenna to receiver antenna i at time instant n, $a_i(n)$ and $\phi_i(n)$ be respectively the amplitude and phase of the internal path through the beamformer from receive antenna i to the output of the combiner at time instant n, and e(n) be the estimation measurement provided by the receiver baseband at time instant n. It should be noted that the amplitudes and phases of the internal paths through the beamformer are known quantities. The estimation $\hat{h}_i(n)$ of channel $h_i(n)$ is derived from two separate baseband measurements, for example two consecutive measurements, e(n−1) and e(n), and is defined as:

$$\hat{h}_i(n) = \frac{e(n-1) - e(n)}{a_i(n-1)e^{j\varphi_i(n-1)} - a_i(n)e^{j\varphi_i(n)}}$$

It should be noted that the estimation is perceived to be most efficient when $\phi_i(n)=\phi_i(n-1)+180°$.

Figure 9:
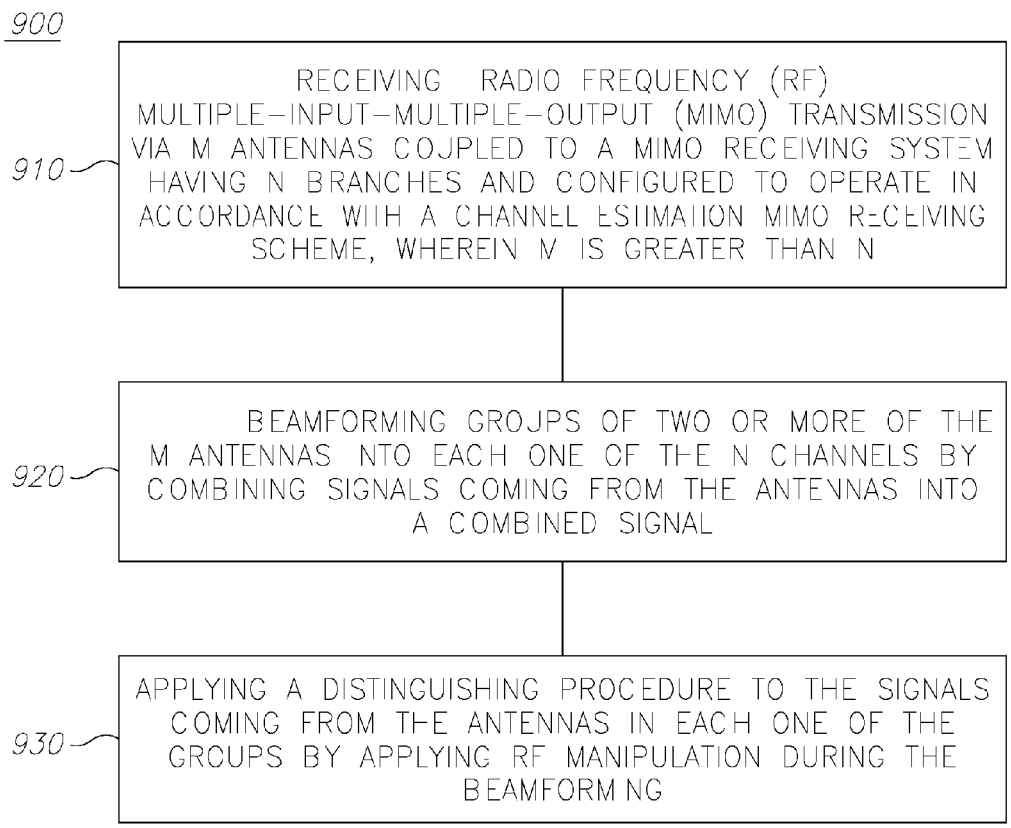
FIG. 9 is a high level flowchart illustrating a method according to some embodiments of the present invention.

FIG. 9 is a high level flowchart illustrating a method 900 according to some embodiments of the present invention. Method 900 may include the following stage: receiving radio frequency (RF) multiple-input-multiple-output (MIMO) signals via M antennas coupled to a MIMO receiving system having N branches and configured to operate in accordance with a channel estimation MIMO receiving scheme, wherein M is greater than N 910; beamforming groups of two or more of the M antennas into each one of the N channels by combining signals coming from the antennas into a combined signal 920; and applying a distinguishing procedure to the signals coming from the antennas in each one of the groups by applying RF manipulation during the beamforming, wherein the distinguishing procedure enable distinguishing between any one of the signals coming from the antennas, within the combined signal 930.

According to some embodiments of the present invention, the aforementioned antenna distinguishing may be carried out in accordance with a corresponding antenna distinguishing scheme being controlled at a baseband domain, namely, by a digital signal processor (DSP) executing a dedicated software.

According to some embodiments of the present invention, method 900 may further include an optional stage of deriving at least one of: phase and amplitude of each one of the distinguished signals; and tuning the beamformer accordingly.

According to some embodiments of the present invention, the aforementioned antenna distinguishing procedure may include selectively applying bypasses for each antenna for bypassing the combining so as to deliver to the MIMO receiving system only the signal from one antenna at a time. In other embodiments, the aforementioned antenna distinguishing procedure is carried out by selectively disconnecting and terminating all but one of the antennas so that only one signal coming the antennas is conveyed to the MIMO receiving system, at a time. In other embodiments, the aforementioned antenna distinguishing procedure is carried out by selectively changing the phase of only one signal coming from the antennas at a time, and wherein the method further comprises deriving phase and/or amplitude of the signal coming from the antenna with the shifted phase by comparing the combined signals at two different phases. In yet other embodiments, the aforementioned antenna distinguishing procedure is carried out by changing the gain of only one signal coming from the antenna at a time, and wherein the method further comprises deriving phase and/or amplitude of the signal coming from the amplified antenna by comparing the combined signals at two different amplifications.

According to some embodiments of the present invention, method 900 may further include an optional stage of identifying and taking into account phase and amplitude difference between the combining and the bypassing.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A system comprising:
a multiple-input-multiple-output (MIMO) receiving system having N branches and configured to operate in accordance with a channel estimation MIMO receiving scheme; and
a radio distribution network (RDN) connected to the MIMO receiving system, the RDN comprising at least one beamformer, being fed by two or more antennas, so that a total number of antennas in the system is M, wherein M is greater than N and wherein N is an integer greater than 1, wherein each of the beamformers includes a combiner configured to combine signals coming from a plurality of antennas associated with the respective beamformer into a single signal, and wherein at least one of the combiners has antenna distinguishing circuitry,
wherein the antenna distinguishing circuitry is configured to distinguish between any one of the signals feeding the combiner.

2. The system according to claim 1, further comprising an RF control module configured to control the antenna distinguishing circuitry in accordance with a corresponding antenna distinguishing scheme.

3. The system according to claim 1, wherein the MIMO receiving system is further configured to derive at least one of: phase and amplitude of each one of the distinguished signals, wherein the derived phase or amplitude is usable for applying appropriate weights to the RDN.

4. The system according to claim 1, wherein the beamformer with the antenna distinguishing circuitry comprises radio frequency (RF) elements including at least one of: a phase shifter, a switch, a terminator, and an amplifier.

5. The system according to claim 1, wherein the beamformer with the antenna distinguishing circuitry comprises a selectable bypass for each antenna configured to bypass the combiner in the beamformer and convey the signal from the antenna to an output selector, and wherein the output selector is configured to deliver to the MIMO receiving system the signal from only one antenna at a time.

6. The system according to claim 5, further comprising a calibration element for each one of the selectable bypass units, wherein the calibration element is configured to identify and take into account phase and amplitude difference between the combiner and the selectable bypass unit.

7. The system according to claim 1, wherein the beamformer with antenna distinguishing circuitry is configured to selectively disconnect and terminate all but one of the antennas so that only one signal coming from the antennas is conveyed to the combiner output, at a time.

8. The system according to claim 1, wherein the beamformer with antenna distinguishing circuitry comprises a phase shifter for each antenna, wherein the phase shifters are configured to change the phase of only one signal coming from the antennas at a time, and wherein the MIMO receiving system is configured to derive phase and/or amplitude of the signal coming from the antenna with the shifted phase by comparing the combined signals at two different phases.

9. The system according to claim 1, wherein the beamformer with the antenna distinguishing circuitry comprises an amplifier for each antenna, wherein the amplifiers are configured to change the gain of only one signal coming from the antenna at a time, and wherein the MIMO receiving system is configured to derive phase and/or amplitude of the signal coming from the amplified antenna by comparing the combined signals at two different amplifications of the signal.

10. A method comprising:
  receiving radio frequency (RF) multiple-input-multiple-output (MIMO) signals via M antennas coupled to a MIMO receiving system having N branches and configured to operate in accordance with a channel estimation MIMO receiving scheme, wherein M is greater than N and wherein N is an integer greater than 1;
  beamforming groups of two or more of the M antennas into each one of the N channels by combining signals coming from the antennas into a combined signal; and
  applying a distinguishing procedure to the signals coming from the antennas in each one of the groups by applying RF manipulation during the beamforming, wherein the distinguishing procedure distinguishes between any one of the signals coming from the antennas, within the combined signal; and
  distinguishing within each combined signal between any one of the signals coming from the antennas in each one of the groups by applying RF manipulation during the beamforming.

11. The method according to claim 10, wherein the antenna distinguishing is carried out in accordance with a corresponding antenna distinguishing scheme being controlled at a baseband domain.

12. The method according to claim 10, further comprising deriving at least one of: phase and amplitude of each one of the distinguished signals; and tuning the beamformer accordingly.

13. The method according to claim 10, wherein the antenna distinguishing comprises selectively applying bypasses for each antenna for bypassing the combining so as to deliver to the MIMO receiving system only the signal from one antenna at a time.

14. The method according to claim 13, further comprising identifying and taking into account phase and amplitude difference between the combining and the bypassing.

15. The method according to claim 10, wherein the antenna distinguishing is carried out by selectively disconnecting and terminating all but one of the antennas so that only one signal coming the antennas is conveyed to the MIMO receiving system, at a time.

16. The method according to claim 10, wherein the antenna distinguishing is carried out by selectively changing the phase of only one signal coming from the antennas at a time, and wherein the method further comprises deriving phase and/or amplitude of the signal coming from the antenna with the shifted phase by comparing the combined signals at two different phases.

17. The method according to claim 10, wherein the antenna distinguishing is carried out by changing the gain of only one signal coming from the antenna at a time, and wherein the method further comprises deriving phase and/or amplitude of the signal coming from the amplified antenna by comparing the combined signals at two different amplifications.

18. A system comprising:
  a Multiple Input Multiple Output (MIMO) receiving system having N branches and further configured to operate in accordance with a channel estimation MIMO receiving scheme;
  N beamformers coupled to the MIMO receiving system, wherein the beamformers comprise at least one combiner and an antenna distinguishing circuitry, wherein the combiner is configured to combine M signals coming from the M antennas into a single combined signal and wherein N is an integer greater than 1; and
  M antennas coupled to the N beamformers configured to receive radio frequency (RF) MIMO, wherein M is greater than N,
  wherein the MIMO receiving system is configured to apply a distinguishing procedure to the signals coming from the M antennas, wherein the distinguishing procedure enable distinguishing between any one of the M signals coming from the M antennas, within the N combined signals.

19. The system according to claim 18, wherein at least some of the beamformers comprise a selectable bypass for each antenna configured to bypass the combiner in the beamformer and convey the signal from the antenna to an output selector, and wherein the output selector is configured to deliver to the MIMO receiving system the signal from only one antenna at a time.

20. The system according to claim 18, wherein at least some of the beamformers are configured to selectively disconnect and terminate all but one of the antennas so that only one signal coming from the antennas is conveyed to the combiner output, at a time.

* * * * *